(12) United States Patent
D'Amours et al.

(10) Patent No.: US 9,374,946 B2
(45) Date of Patent: Jun. 28, 2016

(54) UNLOADING DEVICE FOR IN-LINE WRAPPER

(75) Inventors: Luc D'Amours, St-Norbert d'Arthabaska (CA); Frédéric Lavoie, Chesterville (CA); Patrice Desrochers, St-Christophe d'Arthabaska (CA)

(73) Assignee: Groupe Anderson Inc., Chesterville (CA)

(*) Notice: Subject to any disclaimer, the term of this patent is extended or adjusted under 35 U.S.C. 154(b) by 253 days.

(21) Appl. No.: 12/951,598

(22) Filed: Nov. 22, 2010

(65) Prior Publication Data

US 2011/0120054 A1 May 26, 2011

Related U.S. Application Data

(60) Provisional application No. 61/263,183, filed on Nov. 20, 2009.

(51) Int. Cl.
*A01F 25/14* (2006.01)
*B65B 55/10* (2006.01)

(52) U.S. Cl.
CPC ............ *A01F 25/14* (2013.01); *A01F 2025/142* (2013.01); *B65B 55/10* (2013.01); *B65B 55/103* (2013.01)

(58) Field of Classification Search
CPC .... B65B 55/10; B65B 55/103; B65B 55/027; B65B 9/13; B65B 67/1277; B65B 9/18; B65B 11/025; B65F 2240/132; A01F 25/14; A01F 2025/142

USPC ............ 53/167, 567, 576, 588, 255, 260, 530, 53/591

See application file for complete search history.

(56) References Cited

U.S. PATENT DOCUMENTS

| | | | |
|---|---|---|---|
| 4,793,124 A | 12/1988 | Anderson | |
| 4,938,006 A * | 7/1990 | Korsgaard | 53/431 |
| 5,003,754 A * | 4/1991 | Stirling | 53/459 |
| 5,012,631 A * | 5/1991 | Hostetler et al. | 53/588 |
| 5,425,221 A * | 6/1995 | Pronovost et al. | 53/567 |
| 5,596,864 A | 1/1997 | Reeves | |
| 5,619,842 A * | 4/1997 | Brubaker et al. | 53/523 |
| 5,829,233 A * | 11/1998 | Stirling | 53/567 |
| 6,070,400 A | 6/2000 | Peeters et al. | |
| 6,089,003 A | 7/2000 | Frey | |

* cited by examiner

*Primary Examiner* — Sameh Tawfik
(74) *Attorney, Agent, or Firm* — Winthrop & Weinstine, P.A.

(57) ABSTRACT

A bale unloading device is provided for unloading bales off from an inline bale wrapping machine. The bale unloading device comprises a telescopic bale unloading member that is found on the unwrapped bale loading end of the bale wrapping machine or on a bale storage trailer attached thereto. When in use, the bale unloading device goes from a retracted state to an extended state, pushing the last bale through a bale wrapping device and towards a wrapped bale support structure located on the wrapped bale unloading end of the bale wrapping machine. The bale unloading member is powered by hydraulic valves/actuators and therefore does not necessitate any manual intervention to unload the last bale from the bale wrapping machine.

17 Claims, 20 Drawing Sheets

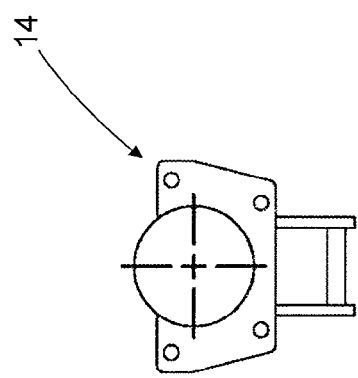
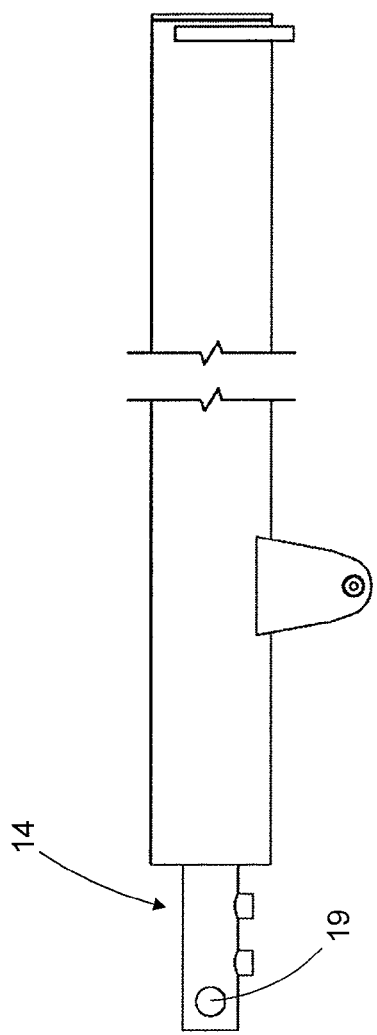
FIG. 10B
FIG. 10A

UNLOADING DEVICE FOR IN-LINE WRAPPER

This application claims priority to U.S. Provisional Application No. 61/263,183 filed Nov. 20, 2009, the content of which is hereby incorporated in its entirety by reference.

FIELD OF THE INVENTION

The present invention generally relates to bale wrapping machines. More particularly, it relates to a device for pushing bales off a bale wrapping machine.

BACKGROUND OF THE INVENTION

Bale wrapping machines allow to wrap bales of hay with a plastic film in order to promote fermentation in order to produce silage. Bale wrapping machines are very popular due to their simplicity, their low cost of acquisition and their efficient performance.

In line bale wrapping machines, like those described in U.S. Pat. No. 4,793,124, U.S. Pat. No. 5,596,864, U.S. Pat. No. 6,070,400 are equipped with a rotatable bale wrapping ring on which 1 to 4 plastic film dispensers are installed. The plastic film on each plastic film roll is pre-stretched and spins around the bale thus limiting air infiltration and allowing for proper fermentation of the silage. The wrapping ring is activated as the bale of hay is fed through it so that a proper cylinder of plastic is wrapped around the bale. The bales are continually placed on the feeding side of the wrapping machine by an operator or via a bale storage trailer that is affixed to the bale wrapping machine. A pushing mechanism, found either on the bale wrapping machine or on the bale storage trailer, guides the bales through the activated rotatable bale wrapping ring and towards the discharge ramp. Once a bale has been fed though by the pushing mechanism, the pushing mechanism is retracted and waits for another bale to be loaded in order to repeat the cycle. The length of a wrapped bale row is variable and depends on the quantity of bales to be stored and the dimensions of the storage facility. It is quite frequent that bale cylinders are made in a reduced size to optimize storage.

To finish the wrapped bale cylinder, it is necessary to wrap and eject the last bales present on the machine. The majority of manufacturers propose the use of steel tubes that are introduced into the pushing mechanism to extend its range. This operation is manual, slow and exhibits risks for the safety of the workers. For example, Tubeline Manufacturing proposes a manual system at uses a transversal bar that the operator must displace between each push to be able to completely empty the loading side of the bale wrapping machine. This principle is disclosed in U.S. Pat. No. 6,089,003 (FREY 2000).

In light of this, it is desirable to have an automatic bale unloading device for an in-line wrapper or for a trailer attached thereto that is inexpensive, easy to maintain, and easy to manufacture.

SUMMARY OF THE INVENTION

An object of the invention is to provide a system that addresses at least one of the above-mentioned needs.

An object of the present invention is to provide a bale unloading device for an inline bale wrapper that is automatic, simple and easy to use.

Accordingly, the present invention provides a bale unloading device for pushing bales off an inline bale wrapping machine, the inline bale wrapping machine comprising:
  a bale loading support structure for supporting unwrapped bales;
  a bale wrapping device adjacent to the bale loading support structure for wrapping bales, the bale wrapping device further comprising:
    an unwrapped bale receiving end adjacent to the bale loading support structure; and
    a wrapped bale unloading end;
  a bale displacement system for moving the unwrapped bales from the bale loading support structure to the bale wrapping device; and
  a wrapped bale support structure adjacent to the bale unloading end of the bale wrapping device for supporting the wrapped bales,
wherein the bale unloading device comprises:
  a telescopic bale unloading member retractably mounted to the bale loading support structure, transferable between an extended state and a retracted state, the telescopic bale unloading member further comprising:
    a back portion; and
    a front portion comprising ramming system for pushing the unwrapped bales from the bale receiving end of the bale wrapping device to the bale unloading end of the bale wrapping device when in the extended state.

In addition, the object of the present invention is to provide a bale unloading device for pushing bales off an inline bale wrapping machine, the inline bale wrapping machine comprising:
  a bale loading support structure for supporting unwrapped bales;
  a bale wrapping device adjacent to the bale loading support structure for wrapping bales, the bale wrapping device further comprising:
    an unwrapped bale receiving end adjacent to the bale loading support structure; and
    a wrapped bale unloading end;
  a bale displacement system for moving the unwrapped bales from the bale loading support structure to the bale wrapping device;
  a wrapped bale support structure adjacent to the unloading end of the bale wrapping device for supporting the wrapped bales;
  a bale storage trailer mountable to the bale loading support structure and allowing for the bales to be transferred from the bale storage trailer to the bale loading support structure,
wherein the bale unloading device comprises:
  a telescopic bale unloading member retractably mounted to the bale storage trailer, the telescopic bale unloading member being transferable between an extended state and a retracted state and further comprising:
    a back portion; and
    a front portion having ramming system for pushing a last of the unwrapped bales from the bale receiving end of the bale wrapping device to the bale unloading side of the bale wrapping device when in the extended state.

BRIEF DESCRIPTION OF THE DRAWINGS

These and other objects and advantages of the invention will become apparent upon reading the detailed description and upon referring to the drawings in which:

FIGS. 10A and 10B are side and front views respectively of the bale unloading device according to a preferred embodiment of the present invention;

DETAILED DESCRIPTION OF PREFERRED EMBODIMENTS

As shown in FIGS. 1 to 12, the present invention provides an automatic bale unloading device for an inline bale wrapper.

Figure 1:
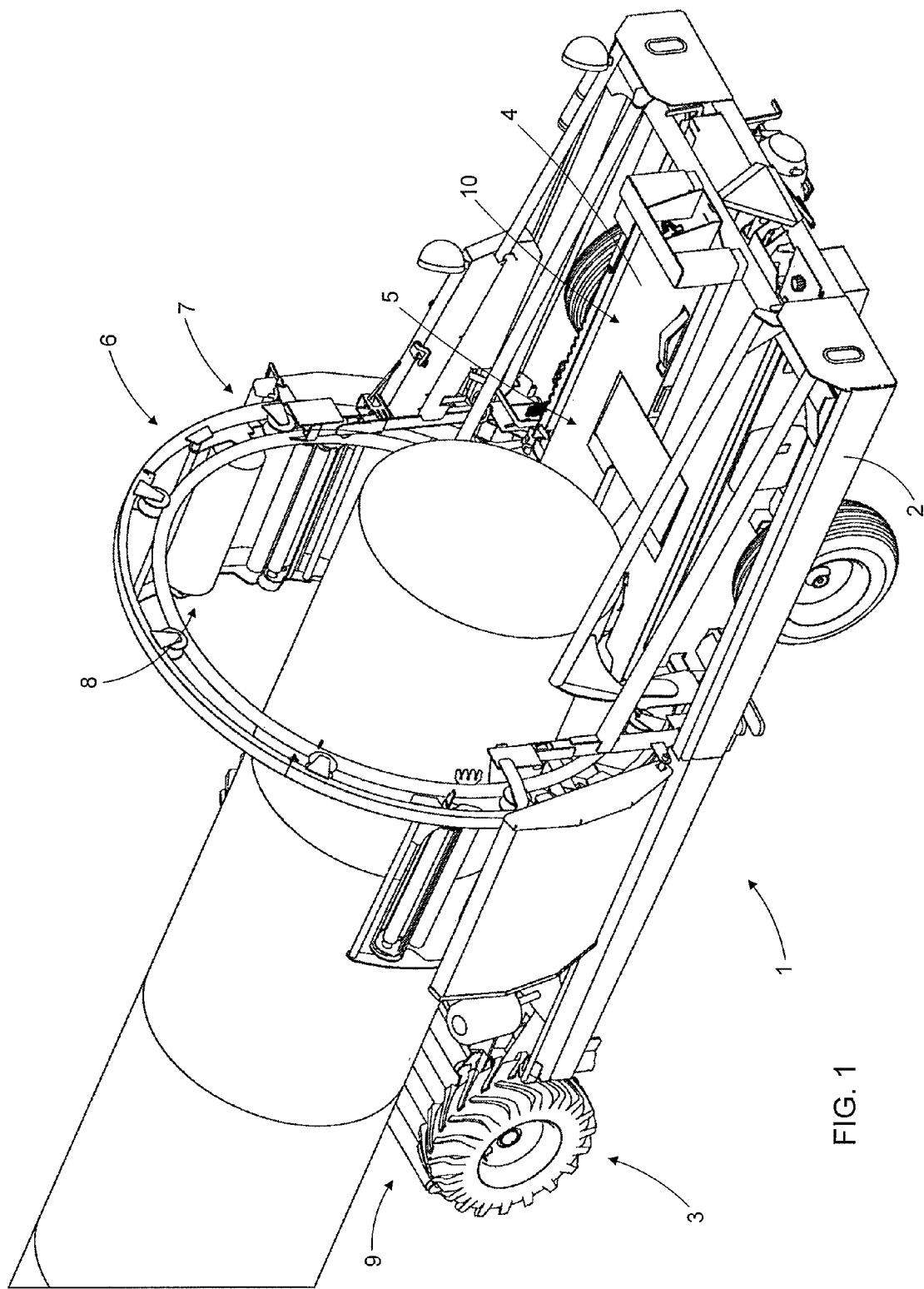
FIG. 1 is a perspective view of the bale wrapping machine according to a preferred embodiment of the present invention, with the bale unloading device in a retracted position.

Accordingly, the bale unloading device (10) is mounted on an inline bale wrapping machine (1). As shown in FIG. 1, the inline bale wrapping machine (1) has a support frame (2). The bale wrapping machine (1) has a displacement system (3) allowing the bale wrapping machine (1) to move along the ground while bale wrapping is desired. The bale wrapping machine (1) also comprises a bale loading support structure (4) for loading unwrapped bales, a bale displacement system (5) for moving the unwrapped bales from the bale loading support structure (4) to a bale wrapping device (6), a bale wrapping device (6) adjacent to the bale loading support structure (4) for wrapping a bale. The bales are fed onto the bale loading support structure (4) and are translated towards the bale wrapping device (6) via the bale displacement system (5).

Preferably, the displacement system (3) of the bale wrapping machine (1) comprises at least two wheels on each side allowing for movement of the bale wrapping machine during the bale wrapping process.

Preferably, the bale wrapping device (6) comprises at least one rotating hoop rotatably fixed onto a non rotating hoop and which carries plastic film that is pre-stretched and wraps around a bale as it passes through the bale wrapping device. Any form of plastic film may be used, however, in another preferred embodiment, the plastic strip is stretchable and in the form of a roll so that a tightly wrapped bale is obtained.

As better shown in FIG. 1, the bale wrapping device (6) has an unwrapped bale receiving end (7) adjacent to the bale loading support structure (4) for receiving loaded bales and a wrapped bale unloading end (8), for unloading wrapped bales onto a wrapped bale support structure (9). The wrapped bale support structure (9) is adjacent to the wrapped bale unloading end (8) of the bale wrapping device (6) and is used to support the wrapped bales once they have passed through the bale wrapping device (6) via the bale displacement system (5).

Preferably, the wrapped bale support structure (9) located on the wrapped bale unloading end (8) of the bale wrapping machine (1) has rollers to aid in the movement of the wrapped bales as they enter the wrapped bale unloading end (8) of the bale wrapping device (6).

Preferably, the bale displacement system (5) that is used to transfer a bale from the bale loading support structure (4) to the bale wrapping device (6) is synchronised with the rotation of the rotating hoop of the bale wrapping device (6) so that a bale is wrapped as it passes through the bale wrapping device (6).

Preferably, the bale displacement system (5) can be a moving mechanism that is either powered or not.

Furthermore, the bale wrapping machine (1) wraps the bales as they are being fed into the bale wrapping device (6) from the bale loading support structure (4) by way of the bale displacement system (5). When the bales are wrapped, they exit the bale wrapping device (6) via the wrapped bale unloading end (8) and are guided via the wrapped bale support structure (9) to eventually be unloaded off the bale wrapping machine (1). As bales are being wrapped, more are being loaded onto the bale loading support structure (4) and fed into the bale wrapping device (6) until the last bale remains. The bale unloading device (10) of the present invention pushes the remaining bales towards the wrapped bale support structure (9).

Figure 2:
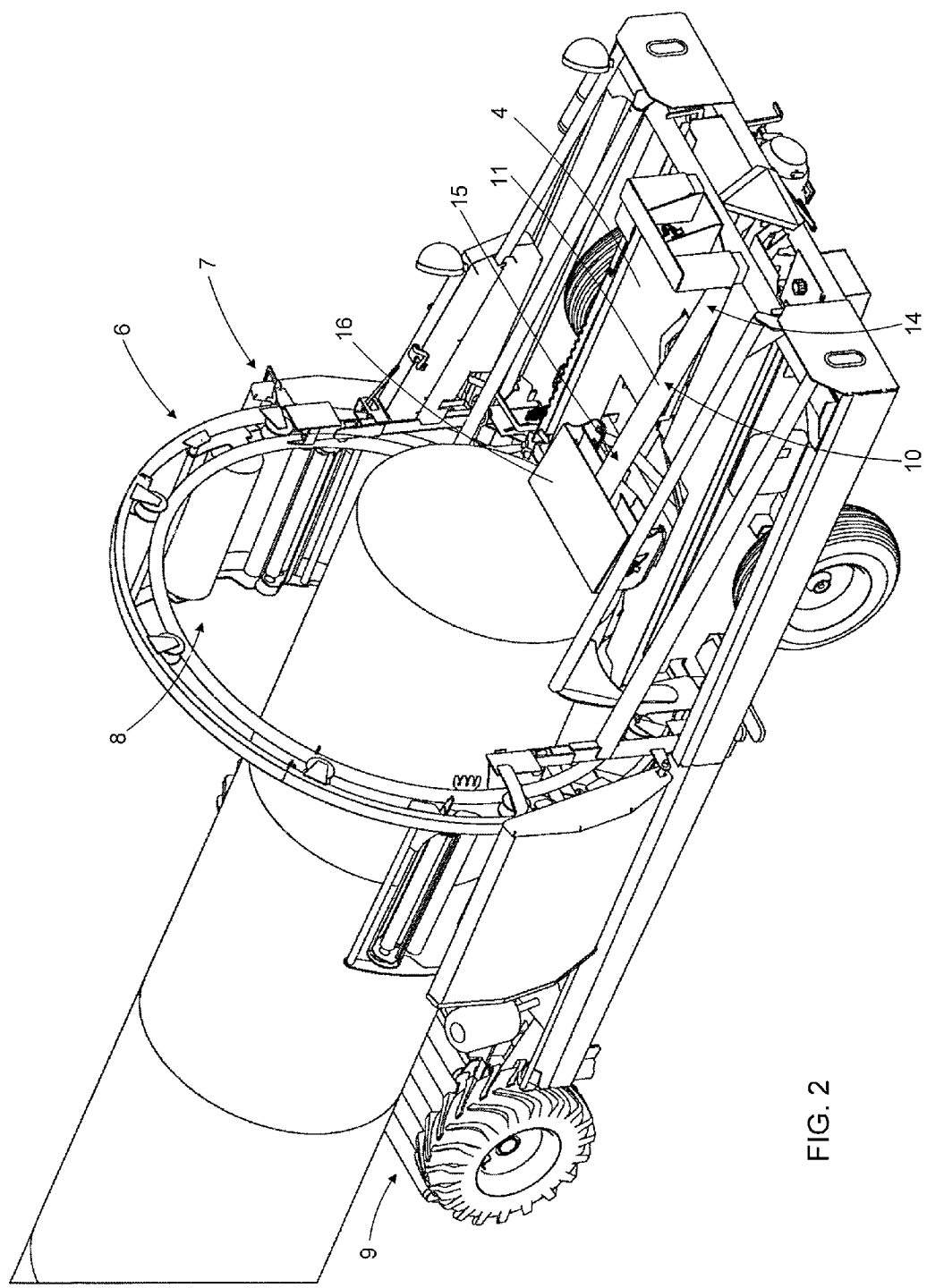
FIG. 2 is a perspective view of the bale wrapping machine shown in FIG. 1 with the bale unloading device in an extended position.
Figure 3:
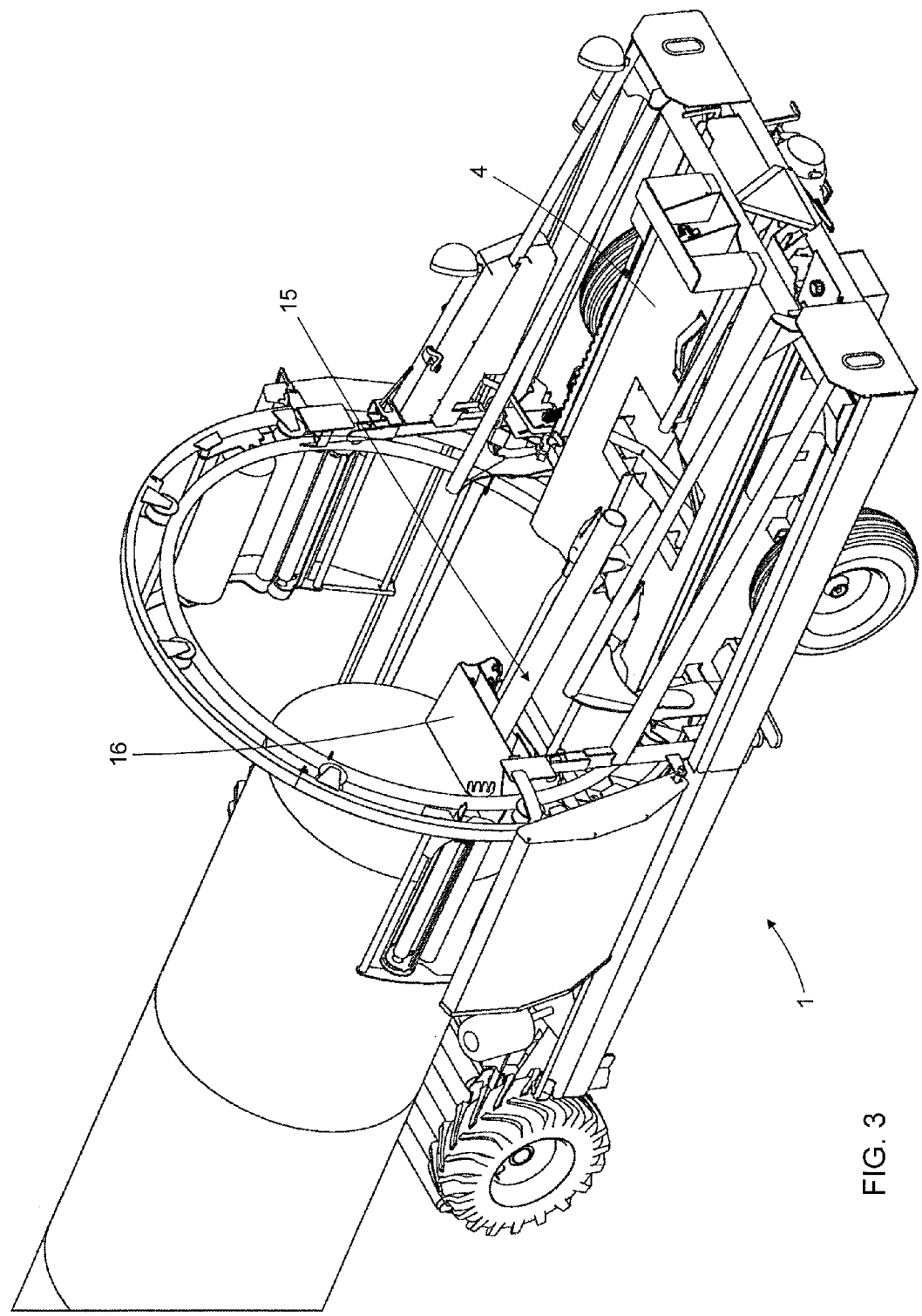
FIG. 3 is a perspective view of the bale wrapping machine shown in FIG. 1 and the bale unloading device pushing an unwrapped bale through the bale wrapping device while in the extended position.
Figure 4:
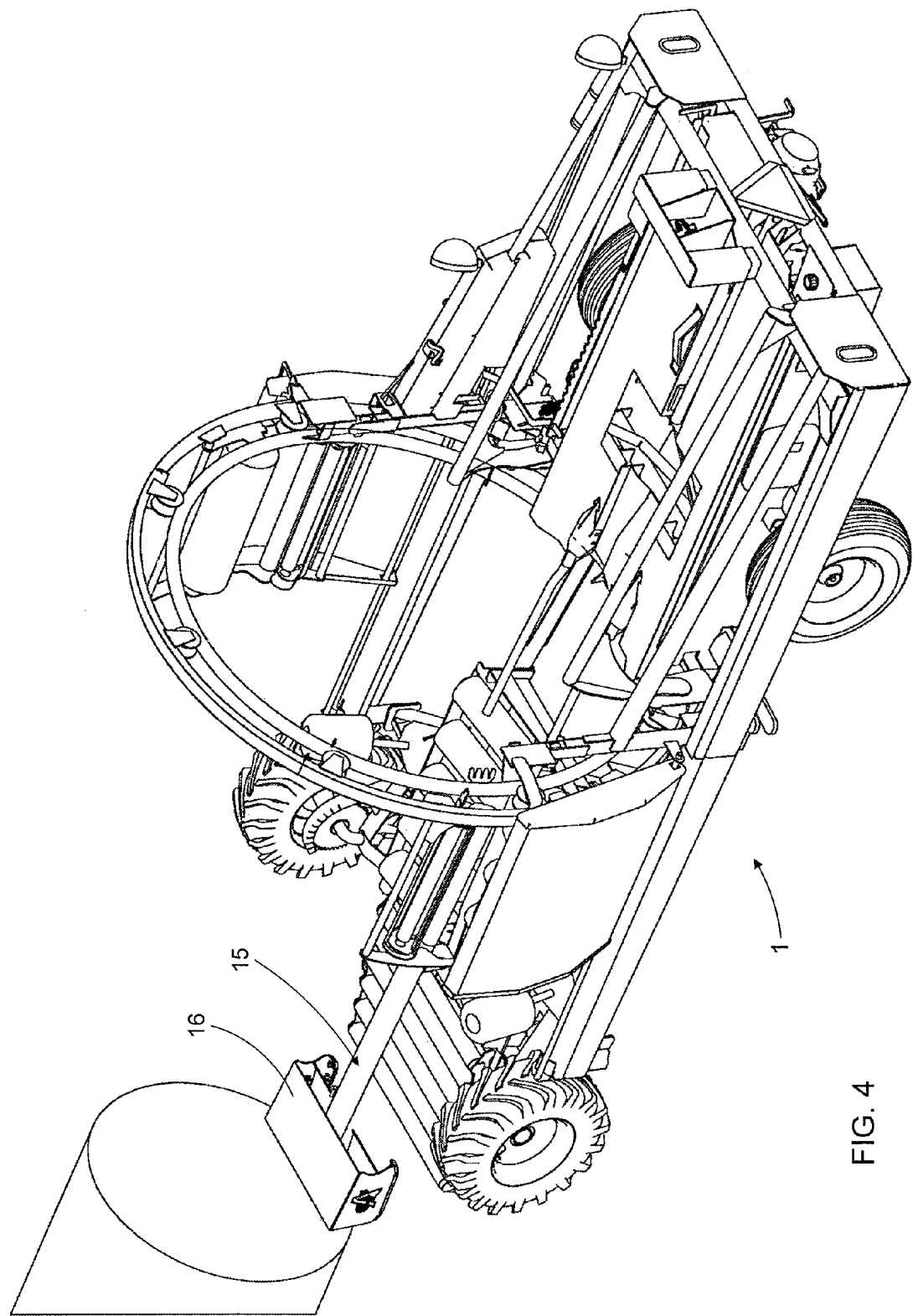
FIG. 4 is a perspective view of the bale wrapping machine shown in FIG. 1 and the bale unloading device pushing a wrapped bale towards the wrapped bale support structure on the unloading side of the bale wrapping device.
Figure 5:
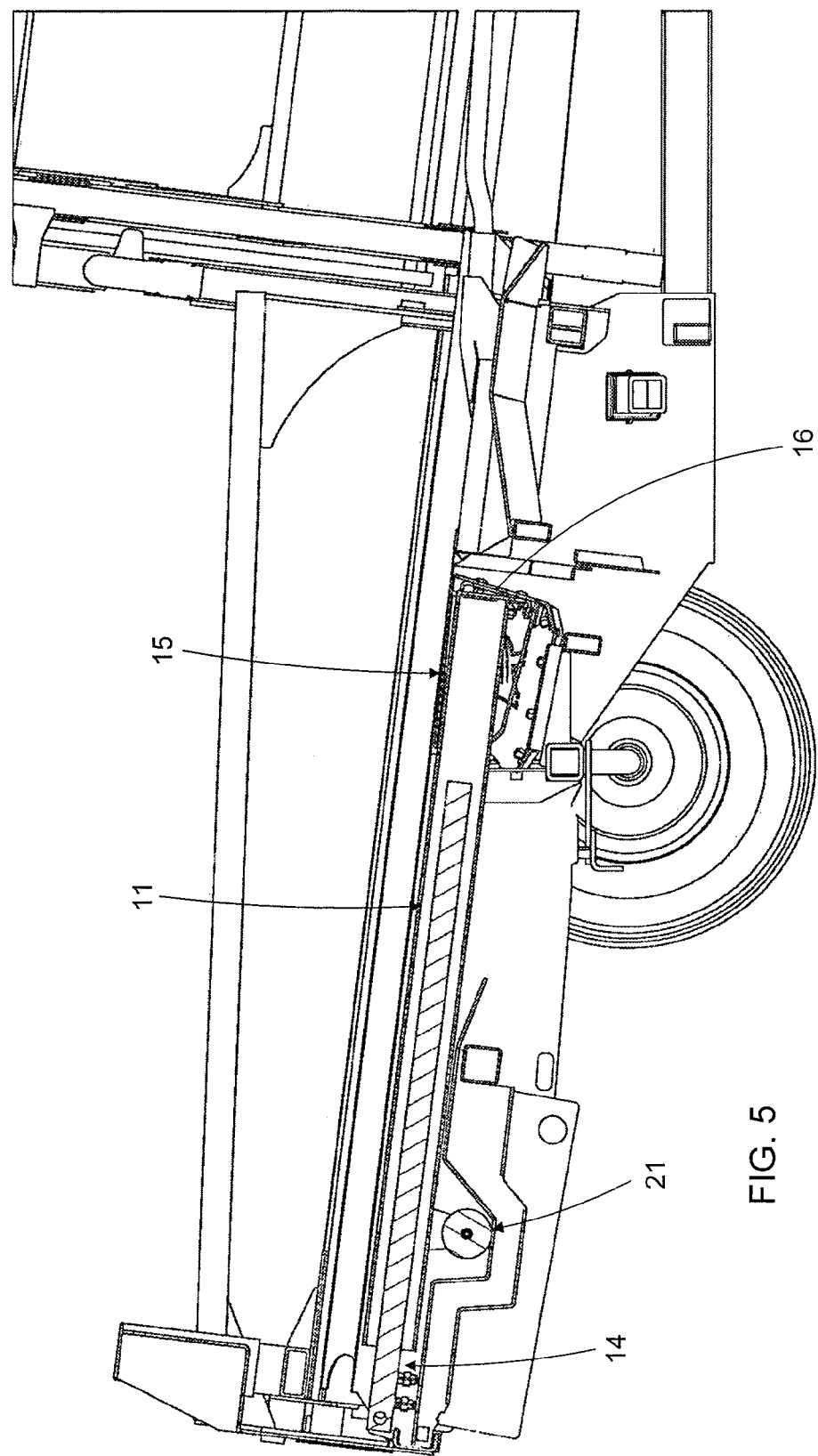
FIG. 5 is a side view of the bale loading support structure and the bale unloading device in its retracted state according to a preferred embodiment of the present invention.
Figure 6:
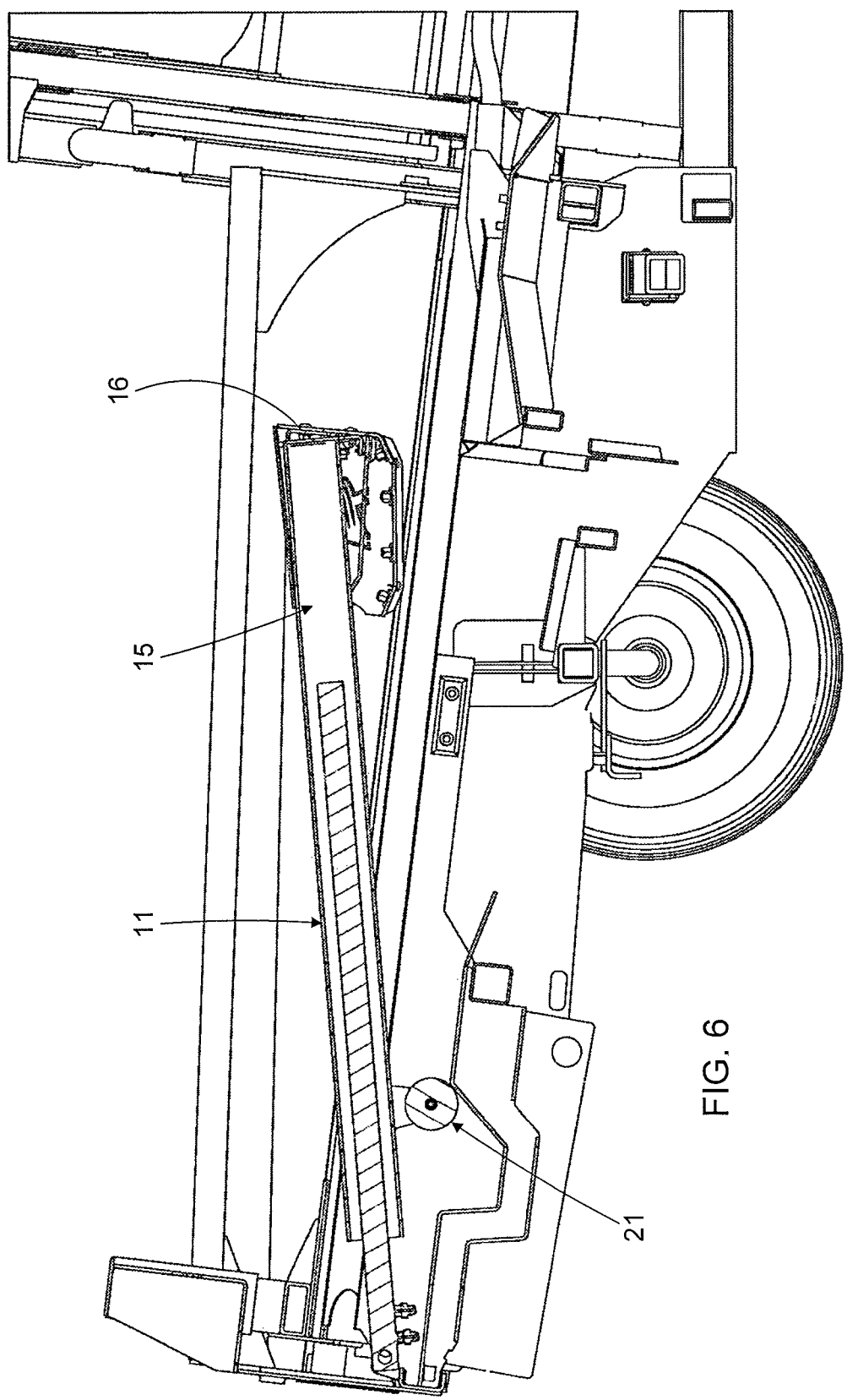
FIG. 6 is a side view of the bale loading support structure and the bale unloading device shown in FIG. 5 in its extended state.
Figure 7:
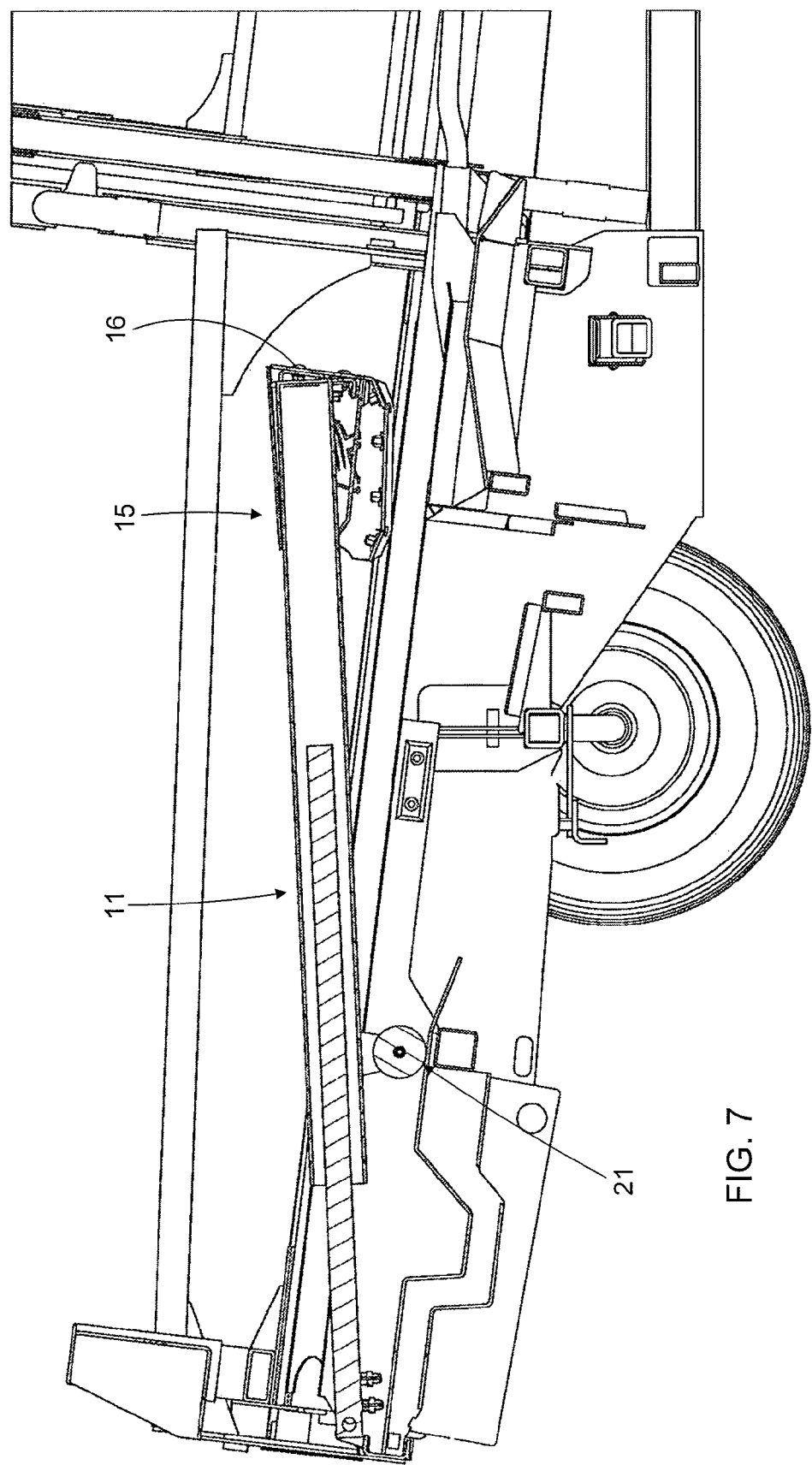
FIG. 7 is a detailed side view of the bale loading support and the bale unloading device shown in FIG. 6 in its extended state.
Figure 8:
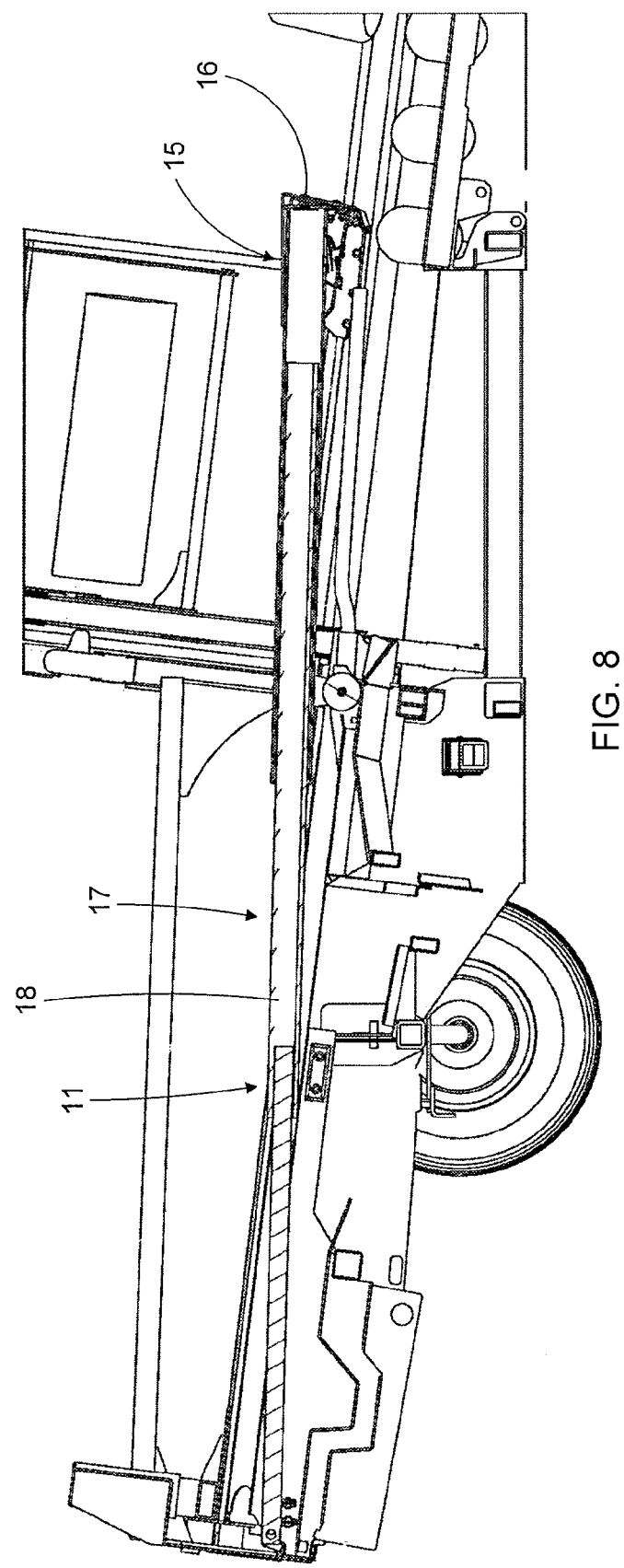
FIG. 8 is a side view of the bale wrapping machine shown in FIG. 1 illustrating the bale unloading device in its extended position pushing a bale through the bale wrapping device and onto a wrapped bale support structure on the unloading side of the bale wrapping device.
Figure 9:
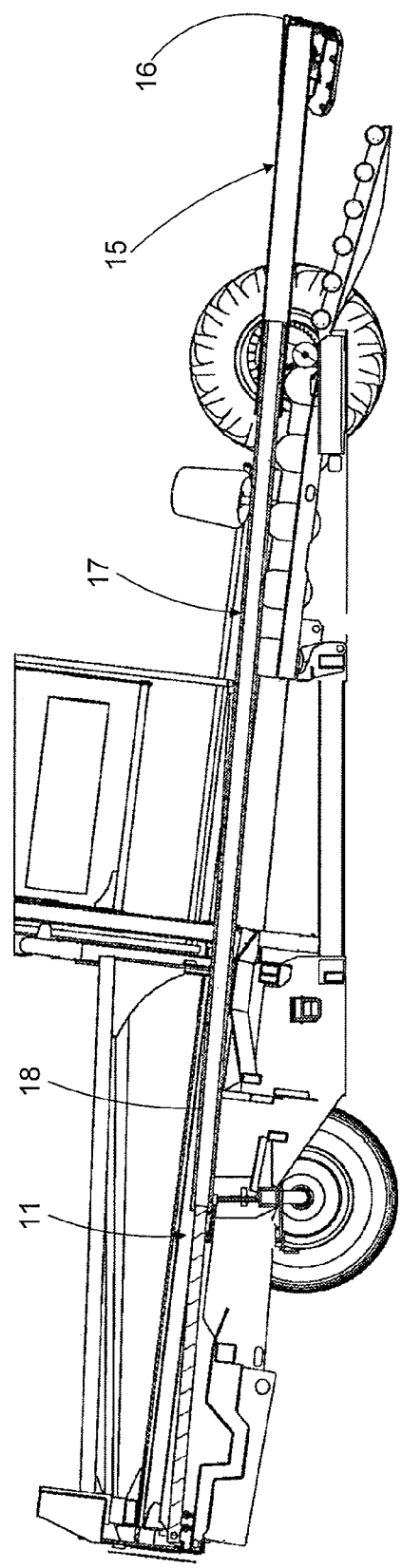
FIG. 9 is a side view of the bale wrapping machine shown in FIG. 8 illustrating the bale unloading device in its extended position pushing a bale off the wrapped bale support structure of the unloading side of the bale wrapping device.

As shown in FIG. 2, the bale unloading device (10) comprises a telescopic bale unloading member (11) retractably mounted on the bale loading support structure (4) of the bale wrapping device (6). FIG. 8 shows the bale unloading member (11) in an extended state; with the unloading member also having a retracted state, as illustrated by FIG. 1.

Figure 11:
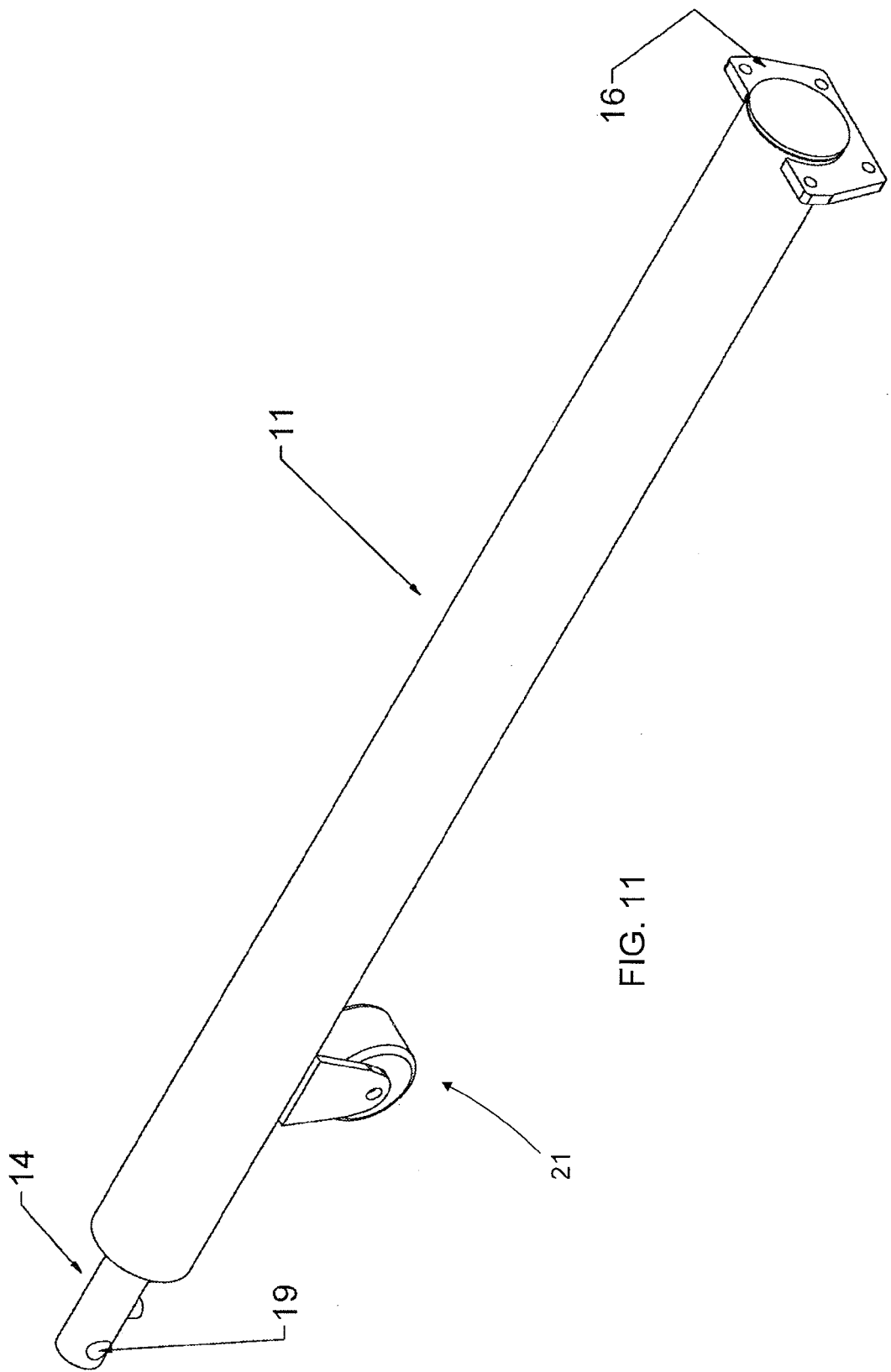
FIG. 11 is a perspective view of the bale unloading device shown in FIGS. 10A and 10B.

As shown in FIG. 11, the bale unloading member (11) has a back portion (14) and a front portion (15), wherein the front portion comprises a ramming system (16) in order to push the last unwrapped bales from the unwrapped bale receiving end (7) of the bale wrapping device (6) to the wrapped bale unloading end (8) of the bale wrapping device (6), when the bale unloading member is in the extended state (12).

As shown in FIG. 2, the back portion (14) of the bale unloading member (11) is attached to the bale loading support structure (4).

Preferably, the bale unloading device (10) is found underneath the bale loading support structure (4) or alternatively, within the support frame (2) of the bale wrapping machine (1).

Preferably, the ramming means (16) is in the form of a plate attached to the front end (15) of the bale unloading member (11) and is used to push the last unwrapped bale through the bale wrapping device (6) and onto the wrapped bale support structure (9) found on the wrapped bale unloading end (8) of the bale wrapping device (6).

Preferably, the bale unloading device (10) is independent from the bale displacement system (5) that conveys the bales from the bale loading support structure (4) through the bale wrapping device (6) and accordingly, does not participate in or interfere with the bale wrapping process.

Preferably, as shown in FIG. 8, the bale unloading member (11) further comprises a middle section (17) comprised of cylindrical segments (18) that slide in one another to bring the unloading member to the retracted state and that form an elongated tube when the unloading member is in an extended state.

Preferably, as shown in FIG. 11, the bale unloading member (11) translates from a retracted state (13) to an extended state (12) via a hydraulic actuator or valve (19), preferably located at the back portion (14) of the bale unloading member (11).

Figure 12:
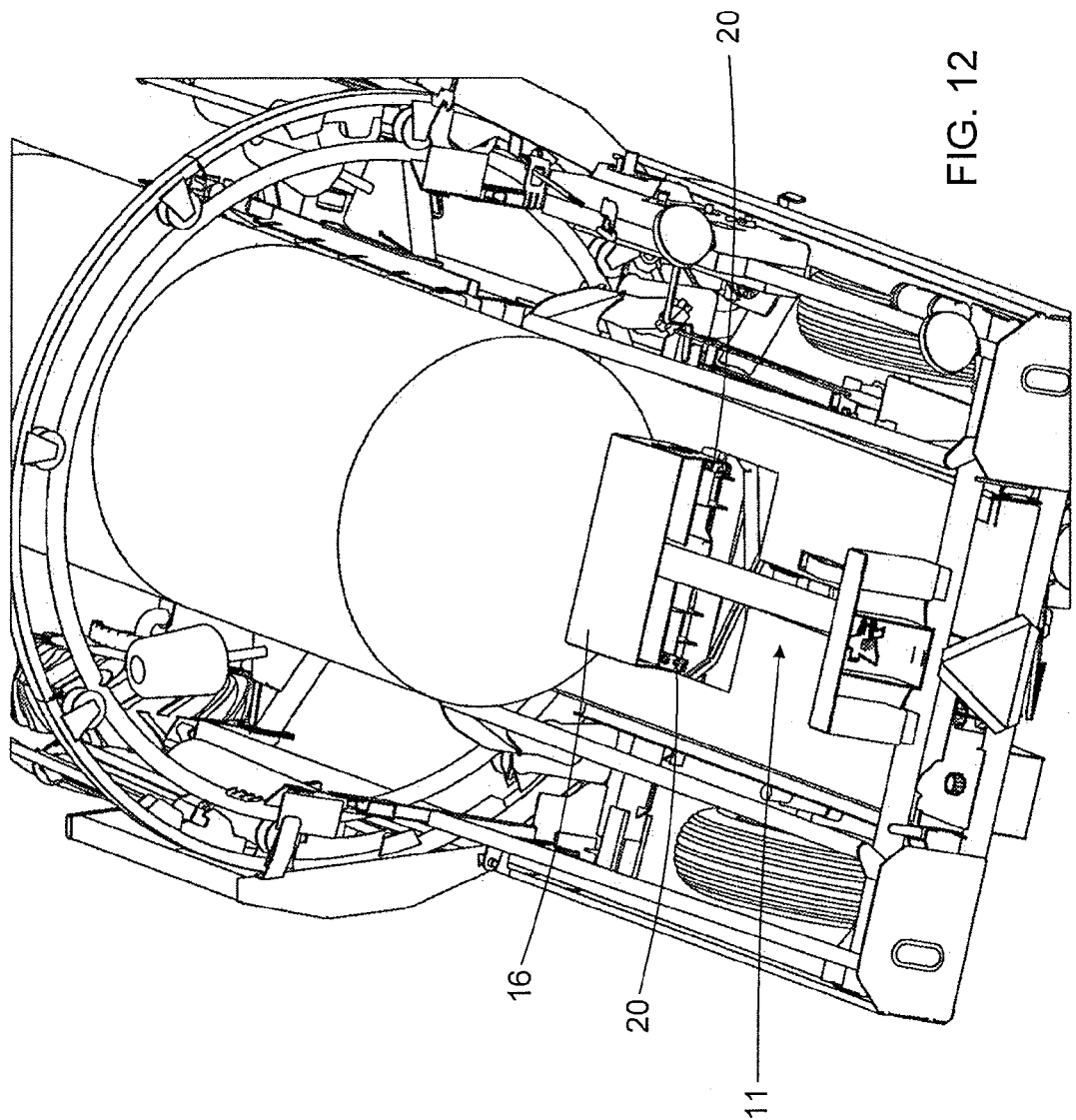
FIG. 12 is a top perspective view of the bale wrapping machine illustrating the bale unloading device pushing a bale through the bale wrapping device towards the wrapped bale support structure located on the bale unloading side of the bale wrapping device, according to another preferred embodiment of the present invention.
Figure 13:
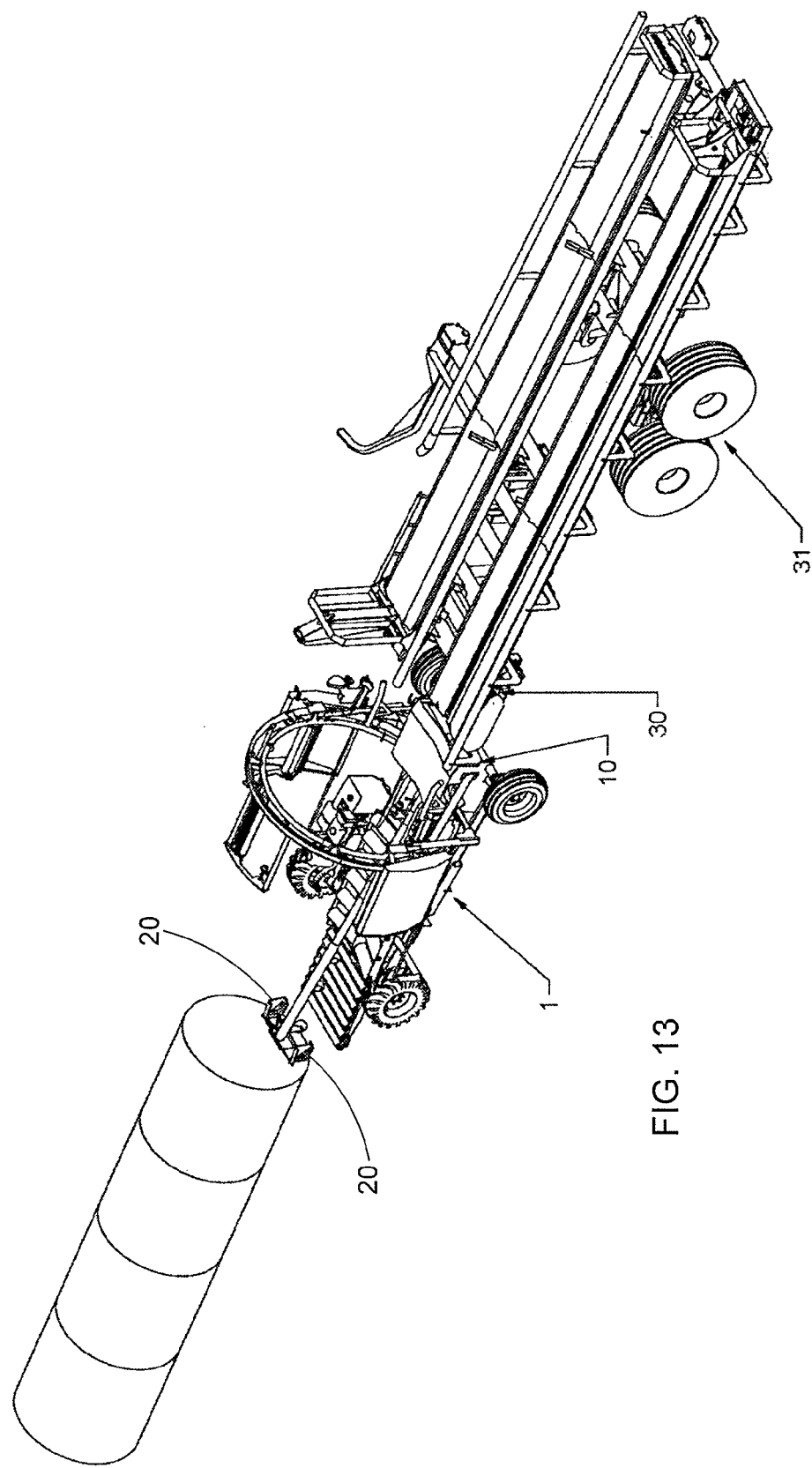
FIG. 13-16 are perspective views of the bale unloading device mounted onto a bale storage trailer according to another preferred embodiment of the present invention.
Figure 14:
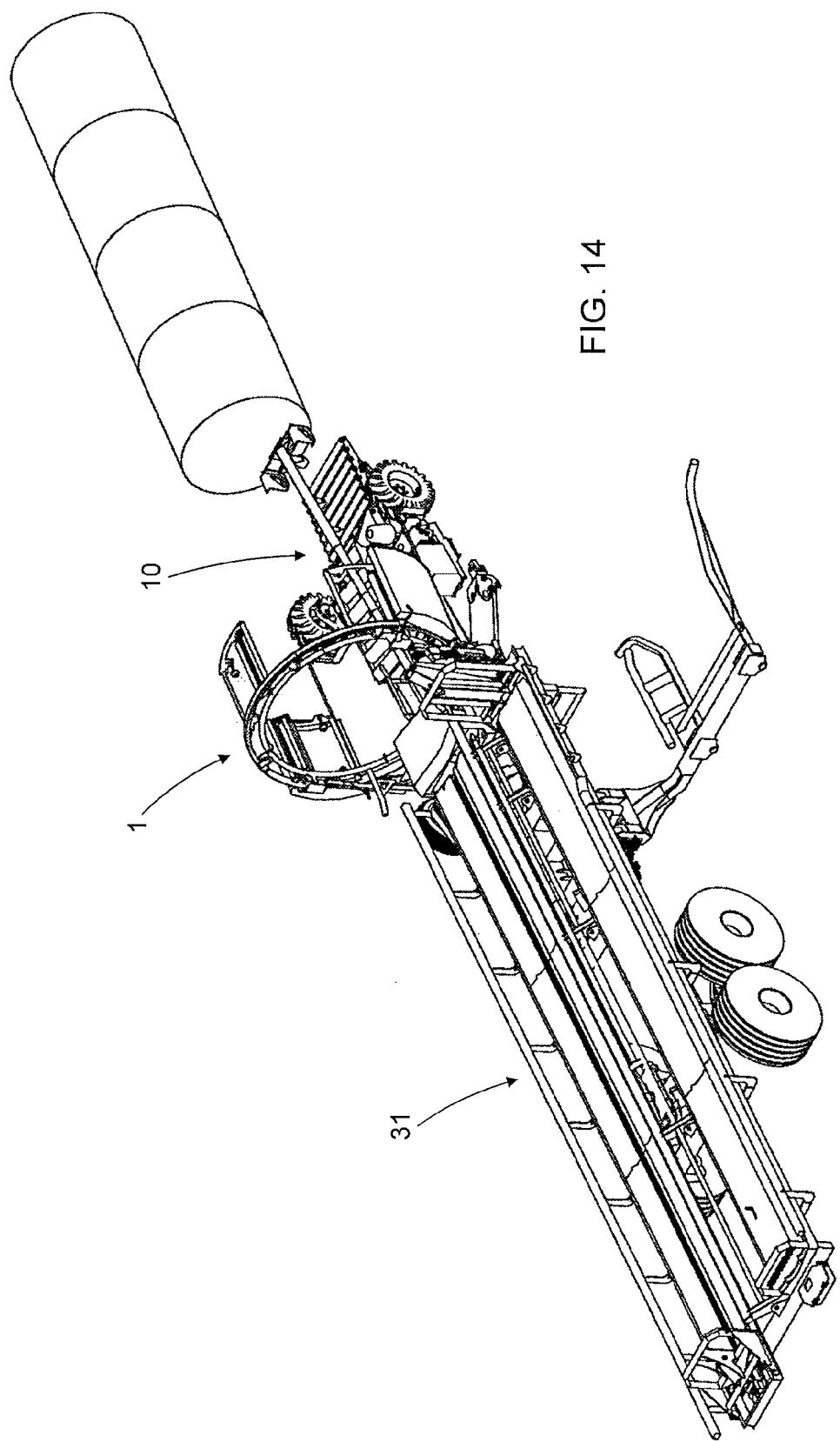
Figure 15:
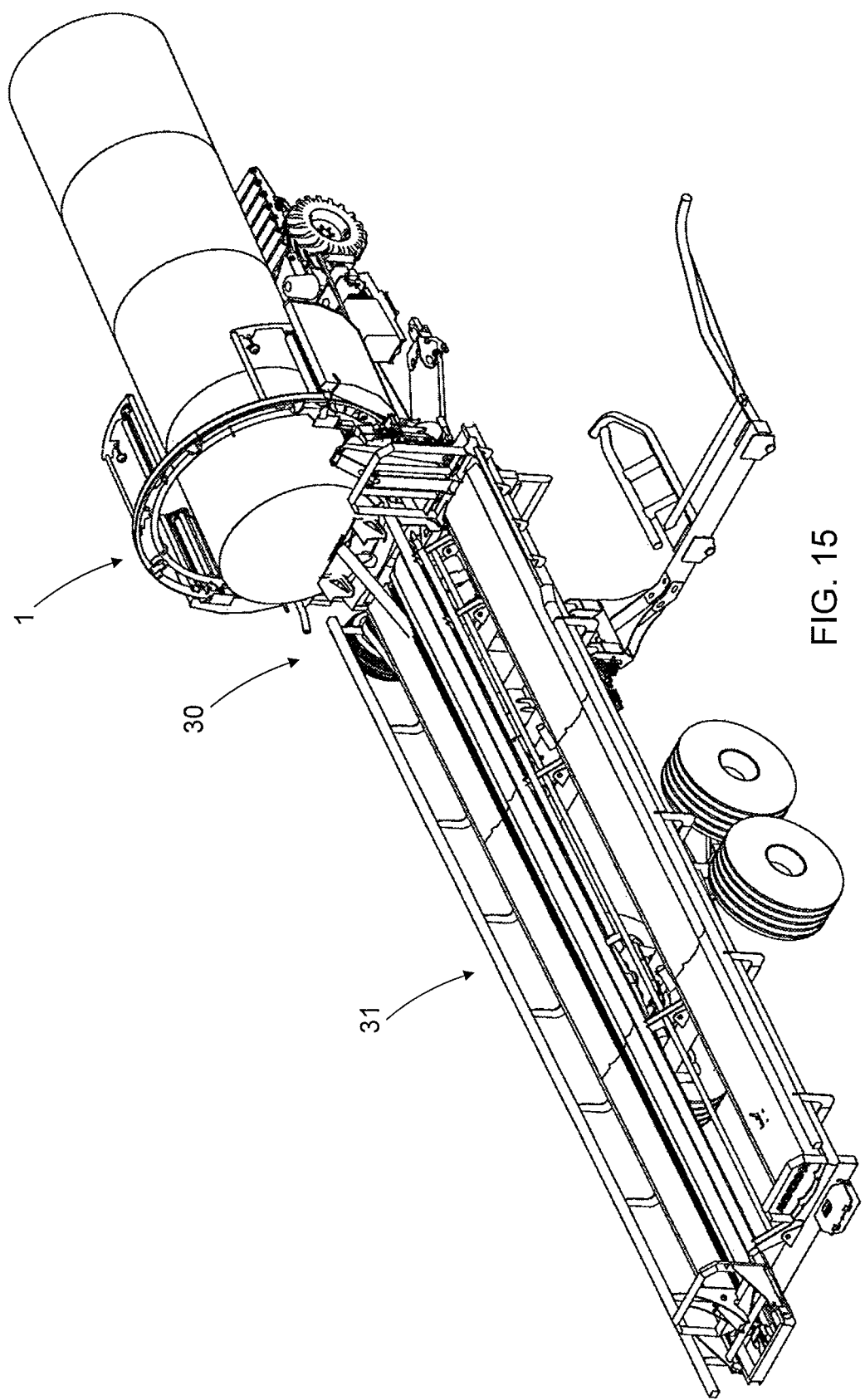
Figure 16:
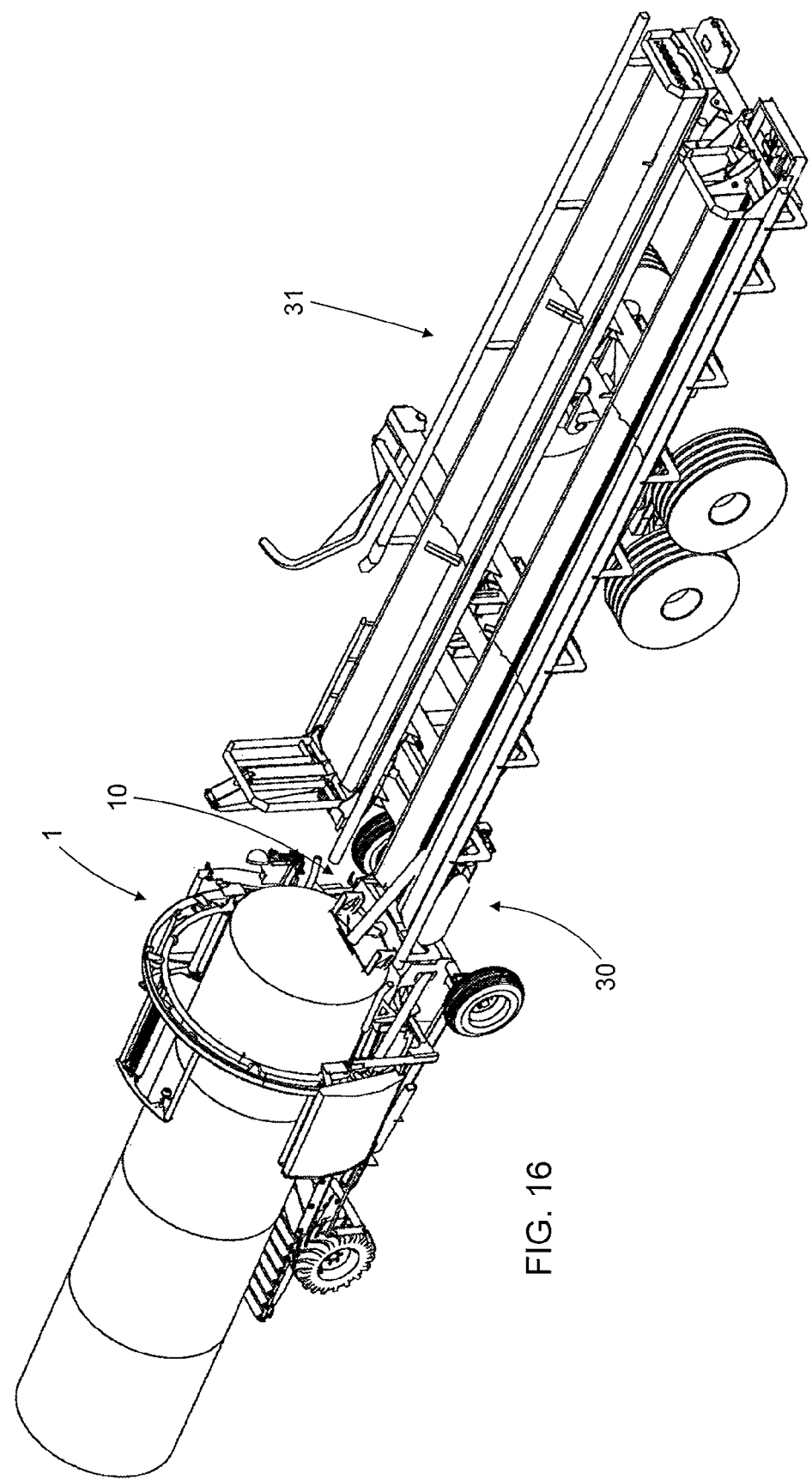
Figure 17:
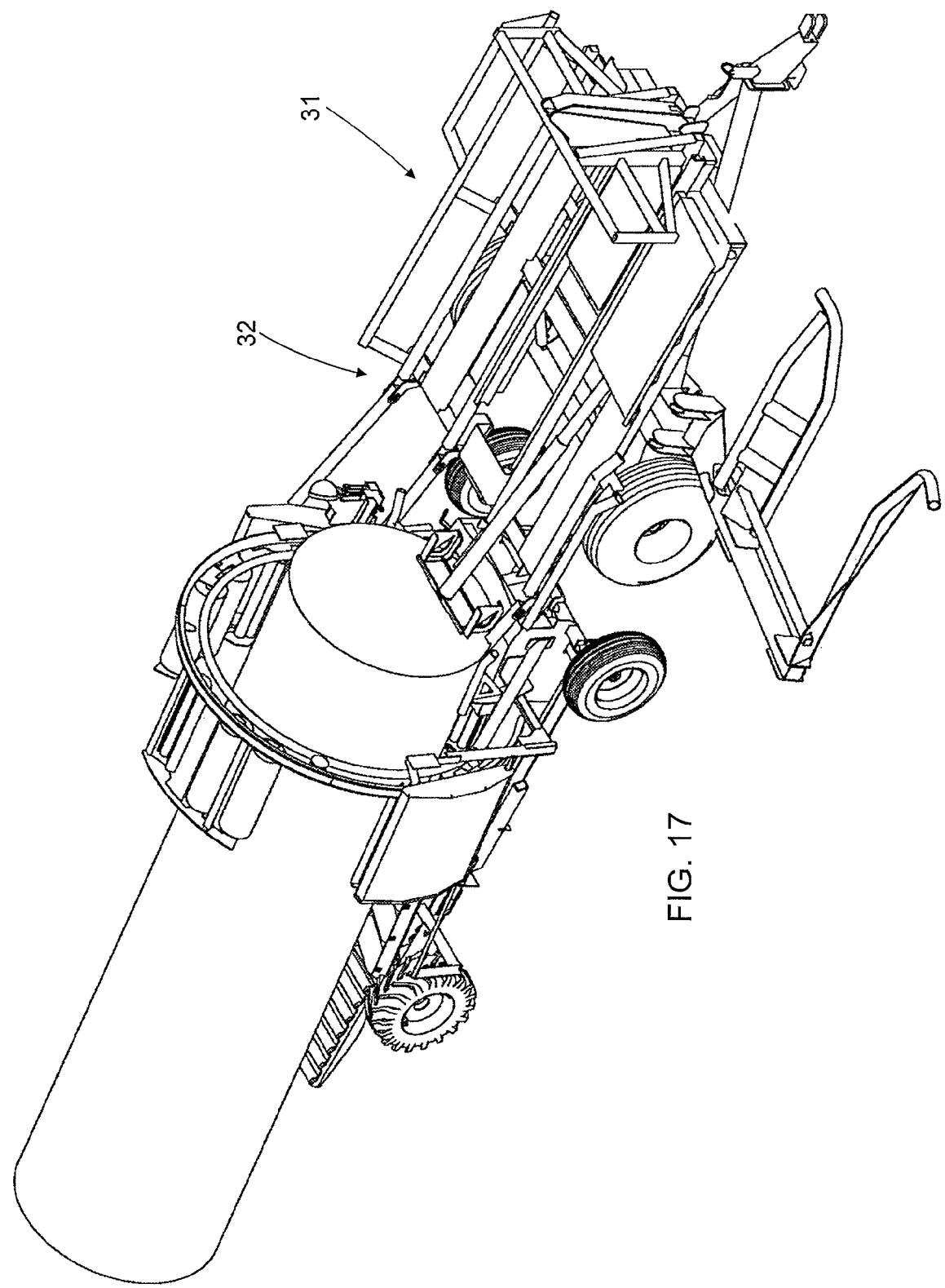
FIGS. 17-20 are additional perspective views of the bale unloading device mounted onto a bale storage trailer according to another preferred embodiment of the present invention.
Figure 18:
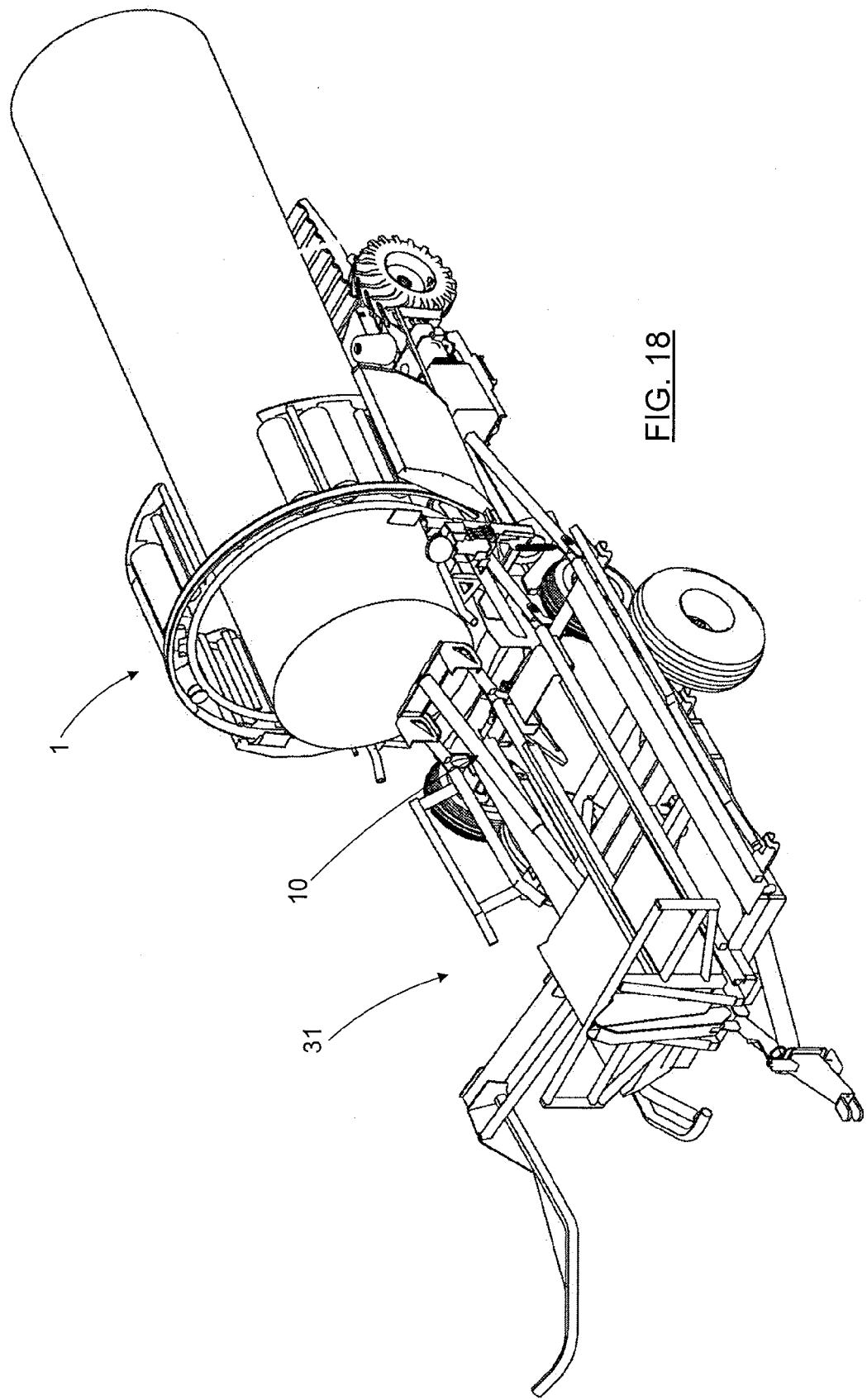
Figure 19:
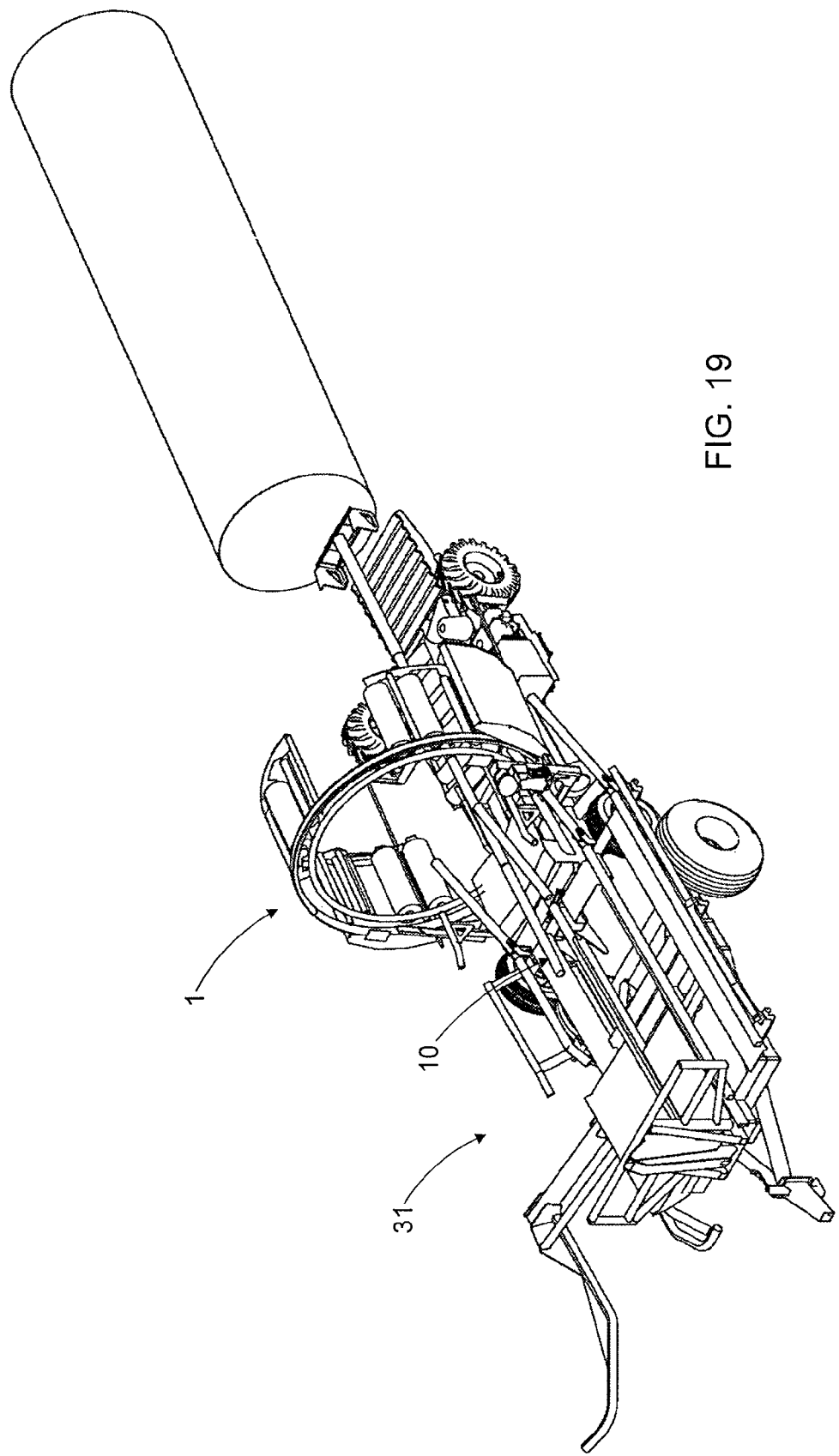
Figure 20:
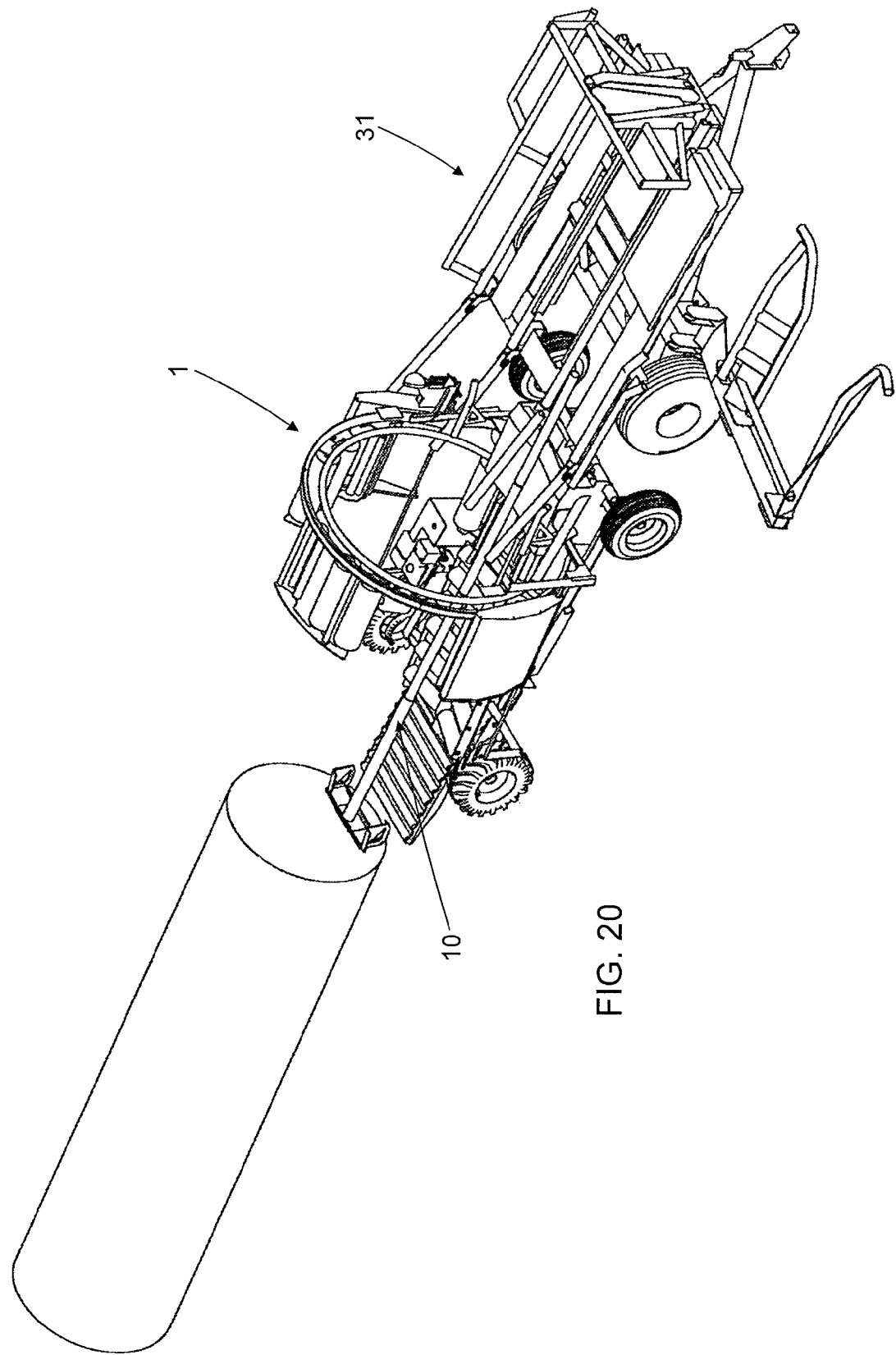

Preferably, as better shown in FIG. 12, the bale unloading device (9) further comprises guiding structures (20) located on each side of the ramming system (16) that are used for keeping the bale unloading member (11) aligned with the bale displacement system (5) of the bale loading support structure (4).

Preferably, in another embodiment of the present invention the guiding structures (20) are selected from the group consisting of skis and sleds, positioned laterally on each side of the ramming means (16).

The guiding structures are used to restrict the rotational movement of the bale unloading member so that it does not rotate along its axis, especially when the unloading member is being returned to its retracted state.

Preferably, and as shown in FIGS. 5, 6, 7, and 11, the bale unloading device (9) is equipped with a member support system (21) located under the telescopic bale unloading member (11) for supporting the bale unloading member (11) as it extends to push the unwrapped bales from the unwrapped bale receiving end (7) of the bale wrapping device (6) to the wrapped bale unloading end (8) of the bale wrapping device (6), and to support the bale unloading member (11) as it retracts back to the bale loading support structure (4).

Preferably, the member support system (21) comprises at least one wheel, which runs along a wheel track located in the support frame (2), providing support and leverage to the bale unloading member as it changes from retracted to extended position.

Preferably, the member support system (21) comprises a skid assembly that run along a track located in the support frame (2), providing support and leverage to the bale unloading member as it changes from retracted to extended position.

Naturally, the member support system can comprise any number of wheels or skid assemblies or a combination of the two. The member support system can also be any means by which support and leverage of the bale unloading member is obtained as it changes from retracted to extended position.

As shown in FIGS. 13 to 16, another embodiment of the present invention provides a bale unloading device (10) for pushing bales off an inline bale wrapping machine (1), where the bale unloading device (10) is mounted to a bale storage trailer (31), where the bale storage trailer (31) communicates with the bale loading support structure (4) in order to transfer the bales from the bale storage trailer (31) to the bale loading support structure (4) of the bale wrapping machine (1).

As shown in FIGS. 13 to 16 and FIGS. 17 to 20, the bale unloading device (10) can be mounted to the front end (30) or the back end (32) of the bale storage trailer (31) respectively.

Although preferred embodiments of the present invention have been described in detailed herein and illustrated in the accompanying drawings, it is to be understood that the invention is not limited to these precise embodiments and that various changes and modifications may be effected therein without departing from the scope or spirit of the present invention.

The invention claimed is:

1. An inline bale wrapping machine comprising:
    a bale loading support structure for supporting unwrapped bales;
    a bale wrapping device adjacent to the bale loading support structure for wrapping bales, the bale wrapping device further comprising:
        an unwrapped bale receiving end adjacent to the bale loading support structure; and
        a wrapped bale unloading end;
    a bale displacement system defining a displacement path, between the bale loading support structure and the bale wrapping device, oriented towards the bale wrapping device, wherein the bale displacement system moves the unwrapped bales from the bale loading support structure to the bale wrapping device;
    a wrapped bale support structure adjacent to the bale unloading end of the bale wrapping device for supporting the wrapped bales; and
    a bale unloading device comprising:
        a variable length telescopic bale unloading member retractably mounted to the bale loading support structure and having an extremity pivotably fixed to the bale loading support structure, the telescopic bale unloading member being transferable between an extended state and a retracted state wherein the telescopic bale unloading member is housed within a support surface of the bale loading support structure supporting the unwrapped bales and wherein the telescopic bale unloading member, in the retracted state, avoids interfering with displacement of unwrapped bales traversing above the telescopic bale unloading member along the displacement path, the telescopic bale unloading member further comprising:
            a back portion; and
            a front portion comprising a ramming system for pushing the unwrapped bales from the bale receiving end of the bale wrapping device to the bale unloading end of the bale wrapping device when in the extended state,
    wherein the bale unloading device operates independently from the bale displacement system and wherein the bale unloading device displaces the wrapped bales along the displacement path.

2. The inline bale wrapping machine of claim 1, further comprising:
    a bale storage trailer mountable to the bale loading support structure and allowing for the bales to be transferred from the bale storage trailer to the bale loading support structure.

3. The inline bale wrapping machine of claim 1, wherein the telescopic bale unloading member further comprises a middle section comprised of cylindrical segments that slide in one another when the unloading member is in the retracted state and that form an elongated tube when the unloading member is in the extended state.

4. The inline bale wrapping machine of claim 1, further comprising a hydraulic actuator for extending the telescopic bale unloading member between the retracted state and the extended state.

5. The inline bale wrapping machine of claim 1, further comprising guiding structures located on each side of the ramming system for keeping the bale unloading member aligned with a track system on the bale loading support structure and thereby restricting rotation of the cylindrical segments along their axes.

6. The inline bale wrapping machine of claim 5, wherein the guiding structures are selected from the group comprising skis and sleds.

7. The inline bale wrapping machine of claim 1, further comprising a member support system located under the telescopic bale unloading member for supporting the bale unloading member as it extends to push the unwrapped bales from the bale receiving end of the bale wrapping device to the bale unloading side of the bale wrapping device, and to support the bale unloading member as it retracts back to the bale loading support.

8. The inline bale wrapping machine of claim 7, wherein the member support system comprises at least one wheel that runs along a wheel support track, providing support and leverage to the bale unloading member as it extends from retracted to extended position.

9. The inline bale wrapping machine of claim 7, wherein the member support system comprises a skid assembly that runs along a support track, said skip assembly providing support and leverage to the bale unloading member as it extends from retracted to extended position.

10. The inline bale wrapping machine of claim 1, wherein the bale wrapping device comprises at least one rotating hoop rotatably fixed onto a non rotating hoop and which carries a plastic film that is pre-stretched and wraps around a bale as it passes through the bale wrapping device.

11. The inline bale wrapping machine of claim 10, wherein the plastic film is stretchable, in the form of a roll and sized to tightly wrap the bales.

12. The inline bale wrapping machine of claim 1, wherein the wrapped bale support structure located on the bale unloading side of the bale wrapping machine comprises rollers to aid in the movement of the wrapped bales.

13. The inline bale wrapping machine of claim 1, comprising a synchronising system for synchronising the bale displacement system with the rotation of the rotating hoop of the bale wrapping device, thereby wrapping the bale as it passes through the bale wrapping device.

14. The inline bale wrapping machine of claim 1, wherein the bale displacement system is a powered moving mechanism.

15. The inline bale wrapping machine of claim 1, wherein the ramming system comprises a plate attached to the front portion of the bale unloading member to push unwrapped bales through the bale wrapping device and onto the wrapped bale support structure on the bale unloading side of the bale wrapping device.

16. The inline bale wrapping machine of claim 1, wherein, in the extended state, the variable length telescopic bale unloading member extends through the wrapping device so as to advance the last bale through the device.

17. The inline bale wrapping machine of claim 16, wherein, in the extended state, the variable length telescopic bale unloading member extends through the wrapping device and beyond the wrapped bale support structure.

* * * * *